UNITED STATES PATENT OFFICE.

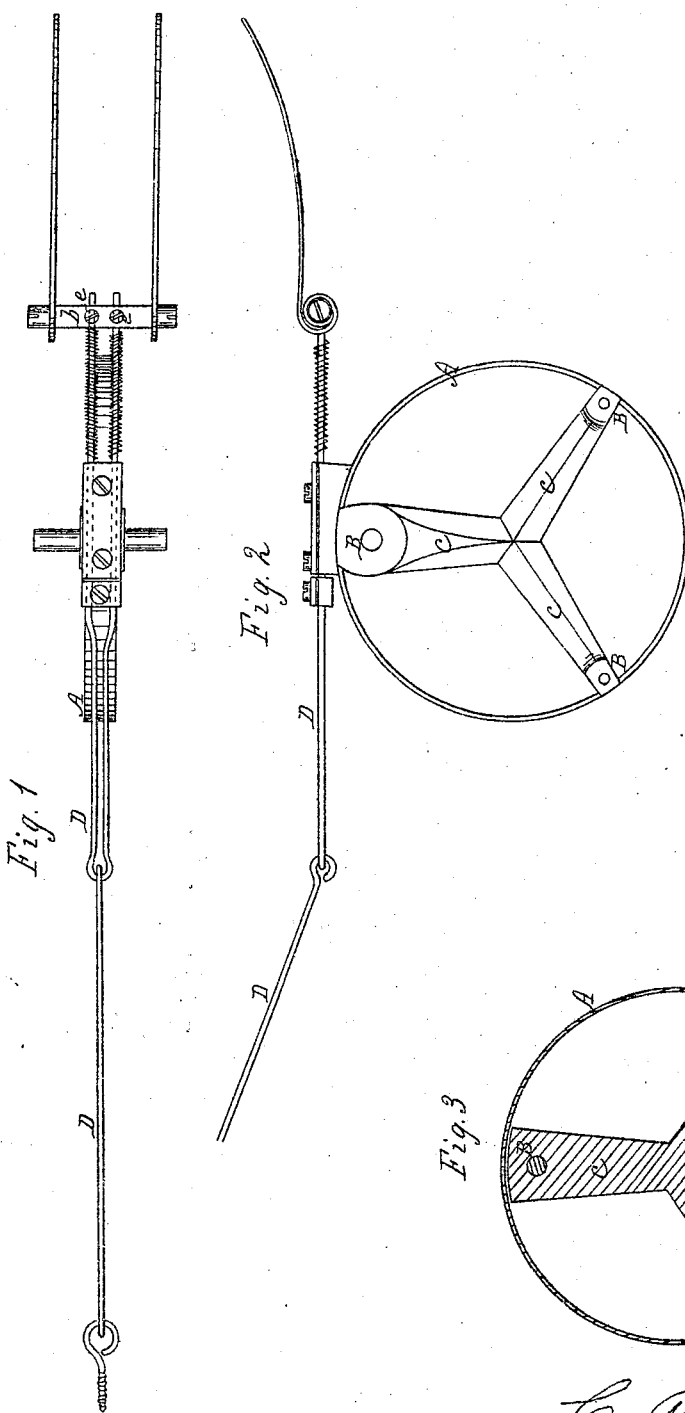

C. R. FRINK, OF NORWICH, NEW YORK.

IMPROVEMENT IN HAY-SPREADERS.

Specification forming part of Letters Patent No. 72,624, dated December 24, 1867.

*To all whom it may concern:*

Be it known that I, C. R. FRINK, of Norwich, Chenango county, and State of New York, have invented a new Improvement in my Patent Hay-Spreader, patented May 8, 1866, No. 54,524, improved October 23, 1866, No. 59,001.

As it will not be necessary to give a full description of the whole machine, I hereby declare that the following is a full and exact description of the improvement in said machine, reference being had to the accompanying drawings, and to the letters of reference being marked thereon.

The nature of the improvement consists in the driving-wheel rim A, fitting around the friction-wheels B B B, and a fork coiled like a bell or watch-spring. The friction-wheels are connected with spokes C C C, and, when fitted together, make three bearings for the rim to turn upon, the shaft being near the end of the spokes, and when said shaft is revolved gives a backward and forward motion to the forks, which are attached to or held by a cap-plate on the rim. The forks are coiled like a bell or watch-spring, and are attached to the cross-head *b* by means of screws, and can be elevated to any given pitch by unloosening the screws that hold the forks, and set the fork any given pitch desired and screw the nuts up to their given place again.

In case of one of the tines breaking, it can be replaced by removing the screw which holds the fork. The set-screws *c c* are to hold the cross-head *b* in its place, and can be elevated or depressed by unloosening the screws and slide it to the proper position required, and then screw them up to their places, which will carry the forks nearer or farther from the surface of the ground.

Claim.

What I claim as new, and wish to secure by Letters Patent, in connection with my patent of October 23, 1866, and No. 59,001, is—

1. The driving-wheel rim A, the friction-wheels B B B, in connection with the spokes C C C, when applied to and for the purpose described.

2. The coiled fork-tines A, cross-head *b*, set-screws *e e*, in connection with rods D D, substantially as and for the purposes set forth.

C. R. FRINK.

Witnesses:
ROBT. A. STANTON,
THOMAS H. LEWIS.